(12) United States Patent  
Dun et al.

(10) Patent No.: US 8,830,565 B2  
(45) Date of Patent: Sep. 9, 2014

(54) CONTROL OF RELAXATION OSCILLATIONS IN INTRACAVITY OPTICAL PARAMETRIC OSCILLATORS

(75) Inventors: Malcolm Harry Dun, Fife (GB); David James Mark Stothard, Fife (GB); Cameron Francis Rae, Fife (GB)

(73) Assignee: University Court of the University of St Andrews, St Andrews (GB)

( * ) Notice: Subject to any disclaimer, the term of this patent is extended or adjusted under 35 U.S.C. 154(b) by 666 days.

(21) Appl. No.: 13/002,309

(22) PCT Filed: Jul. 30, 2009

(86) PCT No.: PCT/GB2009/001871  
§ 371 (c)(1),  
(2), (4) Date: Jan. 21, 2011

(87) PCT Pub. No.: WO2010/013003  
PCT Pub. Date: Feb. 4, 2010

(65) Prior Publication Data  
US 2011/0116158 A1 May 19, 2011

(30) Foreign Application Priority Data

Jul. 31, 2008 (GB) .................................. 0813980.0

(51) Int. Cl.
| | |
|---|---|
| G02F 1/35 | (2006.01) |
| H01S 3/10 | (2006.01) |
| H01S 3/107 | (2006.01) |
| H01S 3/13 | (2006.01) |
| H01S 3/136 | (2006.01) |
| H01S 3/108 | (2006.01) |
| H01S 3/109 | (2006.01) |
| H01S 3/081 | (2006.01) |
| H01S 3/16 | (2006.01) |
| H01S 3/06 | (2006.01) |
| H01S 3/0941 | (2006.01) |
| H01S 3/082 | (2006.01) |
| H01S 3/08 | (2006.01) |

(52) U.S. Cl.  
CPC ............. *H01S 3/1083* (2013.01); *H01S 3/0816* (2013.01); *H01S 3/107* (2013.01); *H01S 3/1673* (2013.01); *H01S 3/0604* (2013.01); *H01S 3/0621* (2013.01); *H01S 3/1306* (2013.01); *H01S 3/09415* (2013.01); *H01S 3/082* (2013.01); *H01S 3/136* (2013.01); *H01S 3/08* (2013.01); *H01S 3/109* (2013.01); *H01S 3/0815* (2013.01); *H01S 3/1611* (2013.01)  
USPC ............................................ 359/330; 372/21

(58) Field of Classification Search  
USPC ......................................................... 359/330  
See application file for complete search history.

(56) References Cited

U.S. PATENT DOCUMENTS

| | | | |
|---|---|---|---|
| 3,947,780 | A | 3/1976 | Rice et al. |
| 4,079,339 | A | 3/1978 | Kobayashi et al. |

(Continued)

FOREIGN PATENT DOCUMENTS

| | | |
|---|---|---|
| EP | 1478062 A2 | 11/2004 |
| FR | 2886745 A1 | 12/2006 |

(Continued)

OTHER PUBLICATIONS

G. A. Turnbull et al, "Continuous-wave singly-resonant intracavity optical parametric oscillator based on periodically-poled LiNbo$_3$"; Electronics Letters; vol. 33, No. 21; Oct. 8, 1997; pp. 1817-1818.

(Continued)

*Primary Examiner* — Hemang Sanghavi  
(74) *Attorney, Agent, or Firm* — W. Kevin Ransom; Moore & Van Allen PLLC

(57) ABSTRACT

An intra-cavity optical parametric oscillator. The oscillator includes means for providing a non-linear loss for suppressing relaxation oscillations.

13 Claims, 8 Drawing Sheets

(56) References Cited

U.S. PATENT DOCUMENTS

| | | | |
|---|---|---|---|
| 5,206,867 | A | 4/1993 | Esterowitz et al. |
| 5,787,102 | A | 7/1998 | Alexander et al. |
| 5,796,761 | A * | 8/1998 | Injeyan et al. ............... 372/3 |
| 6,130,900 | A * | 10/2000 | Black et al. ............. 372/25 |
| 6,215,800 | B1 * | 4/2001 | Komine ............. 372/22 |
| 7,339,718 | B1 * | 3/2008 | Vodopyanov et al. ........ 359/326 |
| 2005/0078718 | A1 | 4/2005 | Spinelli et al. |
| 2005/0276285 | A1 * | 12/2005 | Huang et al. ............ 372/10 |
| 2007/0291801 | A1 | 12/2007 | Caprara et al. |
| 2007/0297033 | A1 * | 12/2007 | Kelley ............ 359/33 |
| 2011/0103413 | A1 * | 5/2011 | Kafka et al. ............. 372/22 |
| 2011/0150015 | A1 * | 6/2011 | Zhou ............ 372/20 |
| 2012/0093179 | A1 * | 4/2012 | Dunn et al. ............ 372/21 |

FOREIGN PATENT DOCUMENTS

| | | |
|---|---|---|
| GB | 2333374 | 8/1998 |
| WO | WO 98/01927 A1 | 1/1998 |
| WO | WO 2006/010916 A2 | 2/2006 |
| WO | WO 2007/085859 A1 | 8/2007 |

OTHER PUBLICATIONS

Y. Cui et al, "Widely tunable all-solid-state optical parametric oscillator for the visible and near infrared"; Optics Letters; vol. 18, No. 2; Jan. 15, 1993; pp. 122-124.

A. Fix et al, "Tunable ultraviolet optical parametric oscillator for differential absorption lidar measurements of tropospheric ozone"; Applied Physics, vol. B75; 2002; pp. 153-163.

F. G. Colville et al, "Continuous-wave, singly resonant, intracavity parametric oscillator"; Optics Letters; vol. 22, No. 2; Jan. 15, 1997; pp. 75-77.

Ebrahimzadeh, "Optical Parametric Devices and Processes"; Josa B vol. 16, No. 9; 1999; p. 1477.

Malcolm H. Dunn et al, "Parametric Generation of Tunable Light from Continuous-Wave to Femtosecond Pulses"; Science; vol. 286; Nov. 19, 1999; pp. 1513-1517.

M. Kenneth Oshman et al, "Theory of Optical Parametric Oscillation Internal to the Laser Cavity"; Journal of Quantum Electronics; vol. QE-4, No. 8; Aug. 8, 1968; pp. 491-502.

G. A. Turnbull et al, "Continuous-wave, intracavity optical parametric oscillators: an analysis of power characteristics"; Applied Physics, vol. B66; 1998; pp. 701-710.

G. A. Turnbull et al, "Transient Dynamics of CW Intracavity Singly Resonant Optical Parametric Oscillators"; Journal of Quantum Electronics; vol. 35, No. 11; Nov. 11, 1999; pp. 1666-1672.

Walter Koechner, "Output Fluctuations of CW-Pumped Nd:YAG Lasers"; Journal of Quantum Electronics; vol. QE-8, No. 7; Jul. 7, 1972; pp. 656-661.

R. Zaibel et al, "Relaxation Oscillations in Quasi-Single-Mode Semiconductor Lasers"; Journal of Quantum Electronics; vol. 3, No. 9; Sep. 9, 1994; pp. 2081-2086.

Thomas H. Jeys, "Suppression of laser spiking by intracavity second harmonic generation"; Applied Optics, vol. 30, No. 9; Mar. 20, 1991; pp. 1011-1013.

Thomas H. Jeys, "Suppression of Laser Spiking by Intracavity Second-Harmonic Generation"; Optical Society of America:1-55752-11-5/89; pp. 337-338.

D. J. Stothard et al, "Low-pump-threshold continuous-wave singly resonant optical parametric oscillator"; Optics Letters; vol. 23, No. 24; Dec. 15, 1998; pp. 1895-1897.

D. H. Lee et al, "Self-injection-locking of a CW-OPO by intracavity frequency-doubling the idler wave"; Optics Express; vol. 5, No. 5; Aug. 30, 1999; pp. 114-119.

UK Search Report for GB0813980.0, dated Oct. 29, 2008.

International Search Report for PCT/GB2009/001871 dated Oct. 28, 2010.

Turnbull et al.: "Continuous-wave, singly-resonant intra-cavity optical parametric oscillator based on periodically-poled LiNbO3"; Electronics Letters 33(21), pp. 1817-1818 (1997).

M. Ebrahimzadeh et al.: "Optical Parametric Oscillators"; Handbook of Optics (second edition), McGraw-Hill, vol. IV, 2001, Chapter 22.

International Search Report for PCT/GB2010/000738 mailed Jul. 13, 2010.

International Property Office Search Report for Great Britain Application GB0906482.5 dated Aug. 4, 2009.

* cited by examiner

CONTROL OF RELAXATION OSCILLATIONS IN INTRACAVITY OPTICAL PARAMETRIC OSCILLATORS

FIELD OF THE INVENTION

The present invention relates to an optical parametric oscillator system, and in particular an intra-cavity optical parametric oscillator.

BACKGROUND OF THE INVENTION

Optical parametric oscillators (OPOs) use parametric frequency conversion in a non-linear crystal to convert light at a fixed short wavelength to tunable outputs at longer wavelengths. More specifically, OPOs take a high-energy, i.e. short wavelength, photon and divide its energy between two newly generated lower-energy, i.e. longer wavelength, photons. The input photon is called the pump and the two outputs are typically called the signal and idler wavelengths, by usual convention the signal wavelength being the shorter of the two wavelengths. For an OPO to work the cavity in which it is located will usually be resonant and have a low loss at the signal and/or idler wavelength(s) and the non-linear crystal has to be phase-matched to efficiently generate light at the correct wavelength.

OPOs are flexible sources of coherent radiation that can be tuned over substantial bandwidths in the ultraviolet, visible and infrared spectral regions. Examples of OPOs are described in the articles "Continuous-wave, singly-resonant intra-cavity optical parametric oscillator based on periodically-poled LiNbO$_3$", by Turnbull et al, Electronics Letters 33(21), pages 1817-1818 (1997); "Widely Tunable all-solid-state optical parametric oscillator for the visible and near infrared" by Cui et al, Optics Letters 18(2), pages 122-124 (1993), and "Tunable ultraviolet optical parametric oscillator for differential absorption lidar measurements of tropospheric ozone" by Fix et al, Applied Physics B 75(2-3), pages 153-163 (2002).

OPOs have been operated on many timescales from the femtosecond pulse to the true continuous-wave. In the case of the latter, the advent of new non-linear materials, in particular periodically-poled non-linear materials, has resulted in these devices becoming practical sources. Periodically poled OPOs comprise non-linear material in which the crystal domain structure is periodically reversed, as shown in FIG. 1. By varying the periodicity of the domain pattern in the crystal, the exact signal and idler wavelengths, which are phase matched to a given pump wavelength, can be changed. In practice, the domains can be periodically reversed by applying a high voltage across the crystal through a patterned electrode.

Despite the advent of periodically poled non-linear materials, problems with the practicality of OPOs still exist. A particular problem, which restricts development of compact/miniature devices, is that substantial pump powers are required for the parametric oscillator to reach threshold. One solution to the high threshold problem is to put the optical parametric oscillator within the cavity of the pump laser. This type of device is known as an intra-cavity optical parametric oscillator. Such a device has been described by a number of authors, see in particular "Continuous-wave, singly-resonant, inter-cavity parametric oscillator" by Colville et al, Optics Letters 22(2), pages 75-77 (1997); "Optical parametric devices and processes" by Ebrahimzadeh, JOSA B 16(9), page 1477 (1999); "Parametric generation of tunable light from continuous-wave to femtosecond pulses" by Dunn et al, Science 286(5444), pages 1513-1517 (1999), and "Internal optical parametric oscillators", by Oshman et al, IEEE, J. Quantum Electronics QE-4, pages 491-502 (1968).

FIG. 2 shows an example of a known intracavity optical parametric oscillator. This has a laser pump arrangement having a semiconductor laser diode 10, a lens 12 and a gain medium 14, into which radiation from the semiconductor laser diode 10 is directed. The lens 12 is provided for optimally matching the spatial profile of the radiation from the laser diode 10 to the mode size, preferably the fundamental mode, of the radiation in the gain chip 14. As a specific example, the laser gain medium 14 is neodymium:vanadate, and the semi-conductor laser diode 10 is adapted to deliver one watt of optical power at 809 nanometers, which is a strong absorption feature of neodymium:vanadate.

On a back surface of the gain medium 14, and integral with it, is a reflective material that defines a first mirror 16. Opposite the gain medium 14 is a second reflective surface 18. Between the laser gain medium 14 and the second reflective surface 18, and along an optical axis thereof, are in sequence a lens 20, a beam splitter 22 and a non-linear material 24, in this case a crystal of periodically poled lithium niobate (PPLN) that is about 50 mm long and has a grating period of 29.3 microns. The purpose of the lens 20 is to enable the appropriate mode sizes to be obtained in the laser gain medium 14 and the non-linear material 24, when used in association with the first and second mirrors 16 and 18. Off the main optical axis is provided a third mirror 26, which is positioned so that light reflected from the beam splitter 22 is directed onto it.

Each of the first and second mirrors 16 and 18 is highly reflective at the wavelength of the light, the pump radiation, emitted from the laser gain medium 14. The beam splitter 22 is highly transmissive at the pump radiation so that it allows light emitted from the gain medium 14 to pass through it and into the non-linear material 24, whilst at the same time is highly reflective to down converted waves emitted from the non-linear material 24 so as to reflect such radiation either onto the third mirror 26 or back into the non-linear material 24. It will be appreciated that a number of combinations of reflectivities at the signal and idler wavelengths of the second and third mirrors exist depending on which or both are the resonant waves. In this case, the second mirror 18 is wholly reflective at the signal wavelength and wholly transmissive at the idler wavelength so that an output can be gained. The third mirror is wholly reflective to down converted light emitted from the non-linear material.

As will be appreciated, the arrangement of FIG. 2 has two coupled cavities, namely a laser pump cavity defined by the optical path between the first and second mirrors 16 and 18, in which the non-linear element 24 is located along with the gain medium of the pump laser 14 itself, and a second cavity, defined by the optical path between the second and third mirrors 18 and 26, that is associated with the wave of the down converted coherent radiation generated by the non-linear material 24.

When the arrangement of FIG. 2 is used, stimulation of the non-linear material 24 by the pump laser 14 causes an optical parametric down conversion process to start and so generates a pair of signal and idler waves. In practice it has been found that the short-term stability ($\times 10^{-6}$-$\times 10^{-3}$ seconds) of the intra-cavity pump field is poor when this down conversion process is present. This can be seen in FIG. 3, which shows the temporal stability recorded by a photodiode that has a response time that is significantly less than the oscillation period. Also shown in FIG. 3 is the intra-cavity pump field stability when the down conversion process provided by the optical parametric oscillator is inhibited, for example, by placing a shutter between the beam splitter 22 and the third mirror 26. It is seen that in this case the pump field exhibits stable operation. Hence, the inclusion of the intra-cavity parametric oscillator within the laser cavity significantly modifies the dynamics of the intra-cavity pump field in the form of relaxation oscillation behaviour, most notably the period and decay time of these oscillations.

As is well known, the occurrence of relaxation oscillations can prove severely detrimental to the operation of an optical parametric oscillator as a stable source in terms of both amplitude and frequency stability of the coherent radiation generated. This is discussed in the articles "Continuous-wave intracavity optical parametric oscillators: an analysis of power characteristics", by Turnbull et al, Applied Physics B 66, pages 701-710 (1998) and "Transient dynamics of CW intracavity singly resonant optical parametric oscillators", by Turnbull et al, IEEE, Journal of Quantum Electronics 35(11), pages 1666-1672 (1999).

Relaxation oscillations are widely known in laser devices. They occur in particular when the upper laser level lifetime exceeds the decay time of the coherent radiation in the passive cavity of the laser. For example, such relaxations are widely known in the case of neodymium lasers and semi-conductor lasers, see "Output fluctuations of CW-pumped Nd: YAG lasers", by Koechner, IEEE Journal of Quantum Electronics QE-8(7), pages 656-661 (1972), and "Relaxation oscillations in quasi-single-mode semiconductor lasers", by Zaibel et al, IEEE Journal of Quantum Electronics 3(9), pages 2081-2086 (1994). However, in the case of intra-cavity optical parametric oscillators, where two coupled cavities are involved in the dynamics of the device, it has been shown, both experimentally and theoretically, that the effects of relaxation oscillations are particularly severe; see previous references to Turnbull et al. These relaxation oscillations can be triggered by many different mechanisms, for example thermal effects in the non-linear medium and interferometric feedback.

SUMMARY OF THE INVENTION

According to one aspect of the present invention there is provided an intra-cavity optical parametric oscillator system including means for providing a non-linear loss for suppressing relaxation oscillations.

By including a means for producing a non-linear loss, in addition to that provided by normal operation of the optical parametric oscillator itself, relaxation oscillations can be reduced or eliminated altogether. This means that the output of the intra-cavity OPO can be made stable. This is advantageous.

Preferably the means for providing a non-linear loss are located in the pump cavity.

The means for providing a non-linear loss may generate a second harmonic of the intra-cavity radiation at the pump laser frequency, that is the fundamental field.

The means for providing a non-linear loss may frequency mix the intra-cavity pump field and the intra-cavity resonant field of the OPO.

The means for providing a non-linear loss may generate a second harmonic of the intra-cavity resonant field of the OPO.

The means for providing a non-linear loss may comprise a quasi-phase matched crystal. An advantage of this is that by varying the crystal temperature the amount of loss can be controlled. Preferably, the quasi-phase matched crystal is a periodically poled non-linear crystal.

The means for providing a non-linear loss may comprise a crystal allowing a type I birefringent phase match process.

The means for providing a non-linear loss may be part of or integral with the down conversion material or crystal of the optical parametric oscillator.

The means for providing a non-linear loss for suppressing relaxation oscillations may comprise means for controlling operation of the OPO in such a manner so as to induce parasitic effects that create a non-linear loss for suppressing relaxation oscillations.

The means for providing the non-linear loss may be variable. The means for providing the non-linear loss may be variable in response to an electrical signal.

Means may be provided for monitoring the intensity of one or other of the intra-cavity fields.

Means may be provided for varying the non-linear loss in response to the monitored instantaneous intensity.

The means for providing the non-linear loss may comprise an optical modulator within a cavity associated with one or other of the intra-cavity fields.

BRIEF DESCRIPTION OF THE DRAWINGS

Various aspects of the invention will now be described by way of example only, and with reference to the accompanying drawings, of which:

FIG. 5(*b*) is a section through a quasi phase matched non-linear crystal, with a fanned grating, for use in an intra-cavity OPO system, the grating pattern being adapted to substantially suppress relaxation oscillations FIG. 6(*a*) shows the relaxation oscillation behaviour of a laser;

FIG. 6(*c*) shows the relaxation oscillation behaviour of the oscillator when a non-linear loss inducing element was positioned in the pump cavity, as shown in FIG. 4;

FIG. 7(*b*) shows the amplitude spectrum of an intracavity optical parametric oscillator with the inclusion of the non-linear loss inducing element.

DETAILED DESCRIPTION OF THE DRAWINGS & EMBODIMENTS

Figure 1:
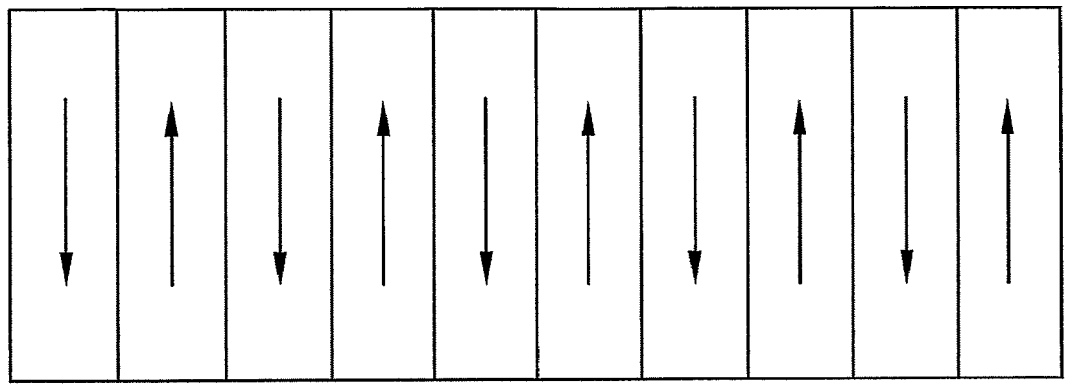
FIG. 1 illustrates periodically poled optical parametric oscillator comprising non-linear material in which the crystal domain stricter is periodically reversed.
Figure 3:
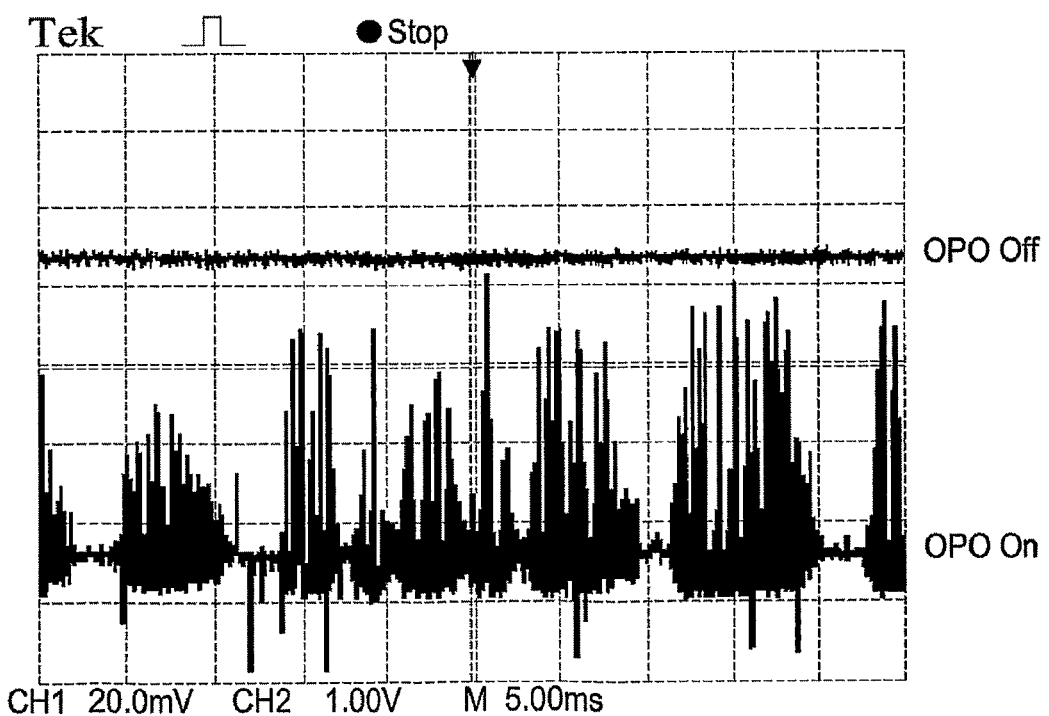
FIG. 3 illustrates a short-term stability of an intra-cavity pump filed when down conversion process is presented.
Figure 2:
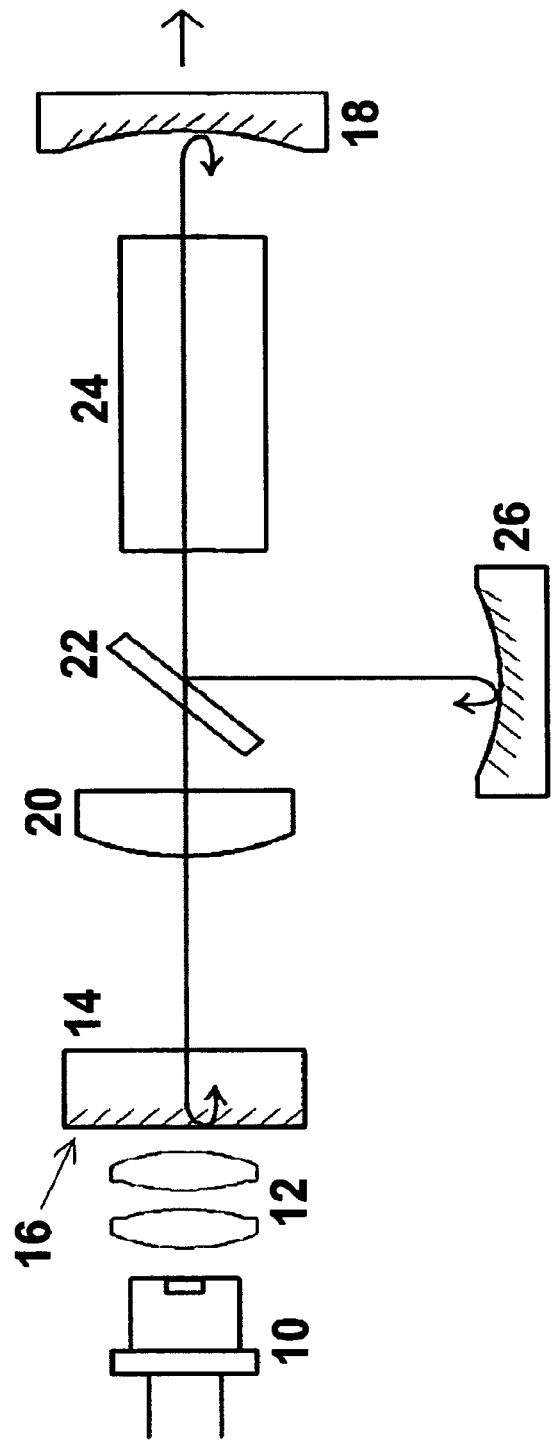
FIG. 2 illustrates an example of a known intra-cavity optical parametric oscillator.
Figure 4:
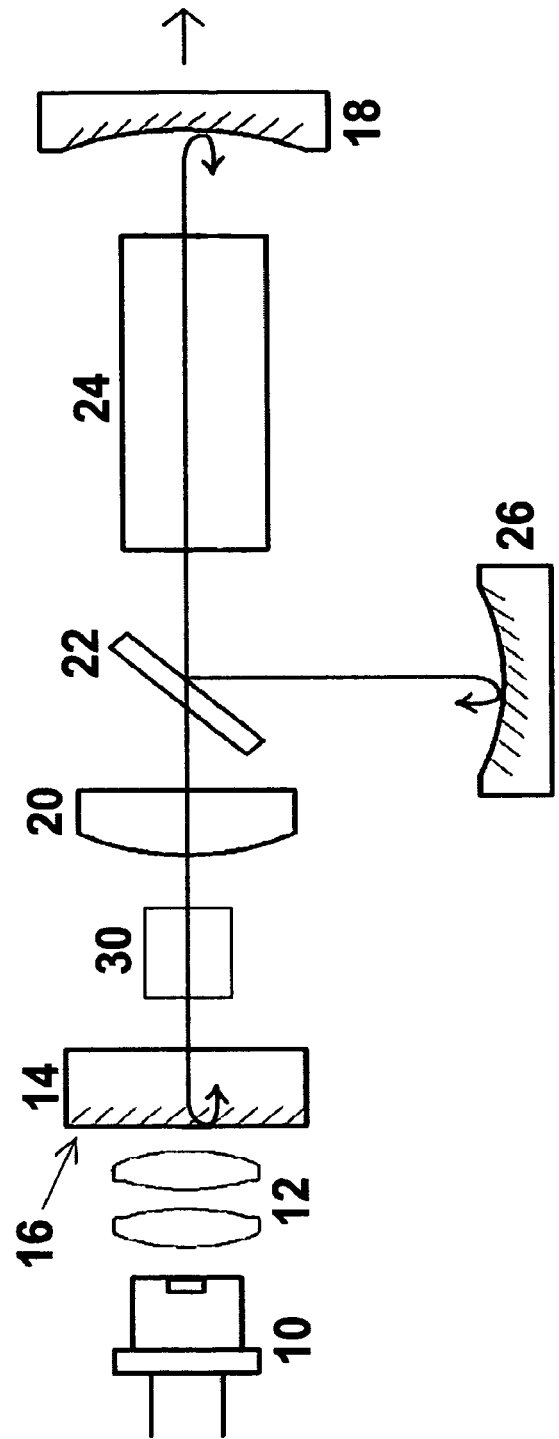
FIG. 4 is a schematic diagram of a first intra-cavity OPO, in which relaxation oscillations are substantially suppressed using a non-linear element.

FIG. 4 shows an intra-cavity optical parametric oscillator based on a neodymium:vanadate laser. The arrangement of FIG. 4 is essentially the same as that for FIG. 2, except in this case an additional non-linear loss-inducing element 30 is inserted in the pump cavity between the laser gain medium 14 and the beam splitter. More specifically, the non-linear element is inserted between the gain medium 14 and the first lens 20, but can also be placed between the first lens 20 and the beam splitter 22. The additional non-linear element 30 has to provide a loss that varies with the relevant optical field intensity to a power greater than one, i.e. it has to provide a loss mechanism by which the amount of loss experienced by the relevant optical field does not vary linearly (i.e. varies super-linearly) with the intensity of that optical field.

Figure 7:
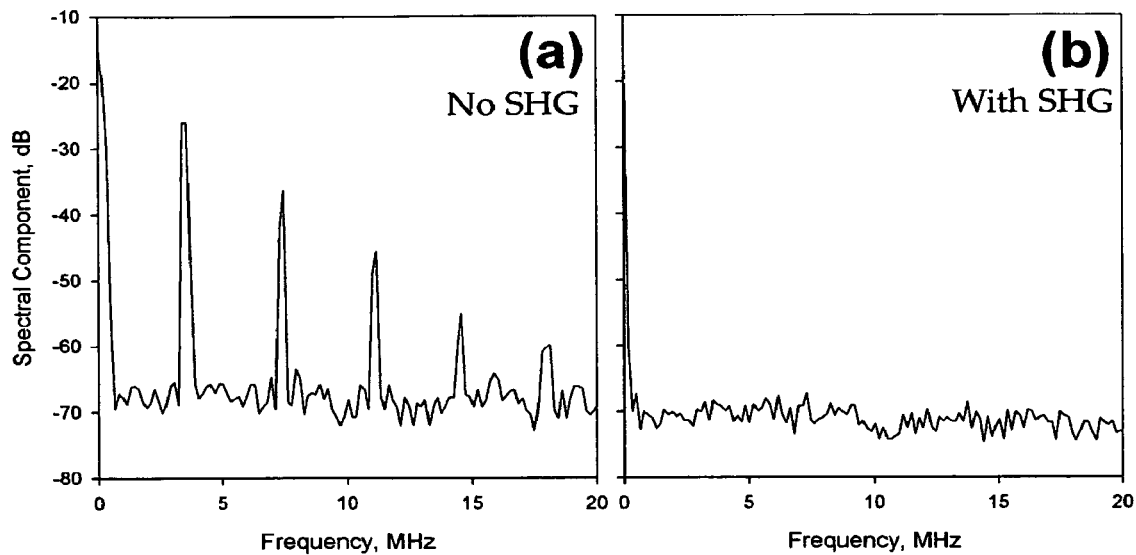
FIG. 7(*a*) shows the amplitude spectrum of an intracavity optical parametric oscillator without the inclusion of the non-linear loss inducing element.

The element 30 may be any suitable device or crystal and may be, for example, a quasi phase-matched crystal or a crystal that allows a type I birefringent phase match process. The inclusion of a non-linear element in the pump cavity provides an instantaneous non-linear loss in the form of frequency doubling of the fundamental pump wave. The incorporation of this additional non-linear loss suppresses relaxation oscillations, with only a modest sacrifice of down converted output power/intensity from the optical parametric oscillator, that is with only a small sacrifice of the useful tunable output power from the optical parametric oscillator as shown in FIG. 7.

Figure 5:
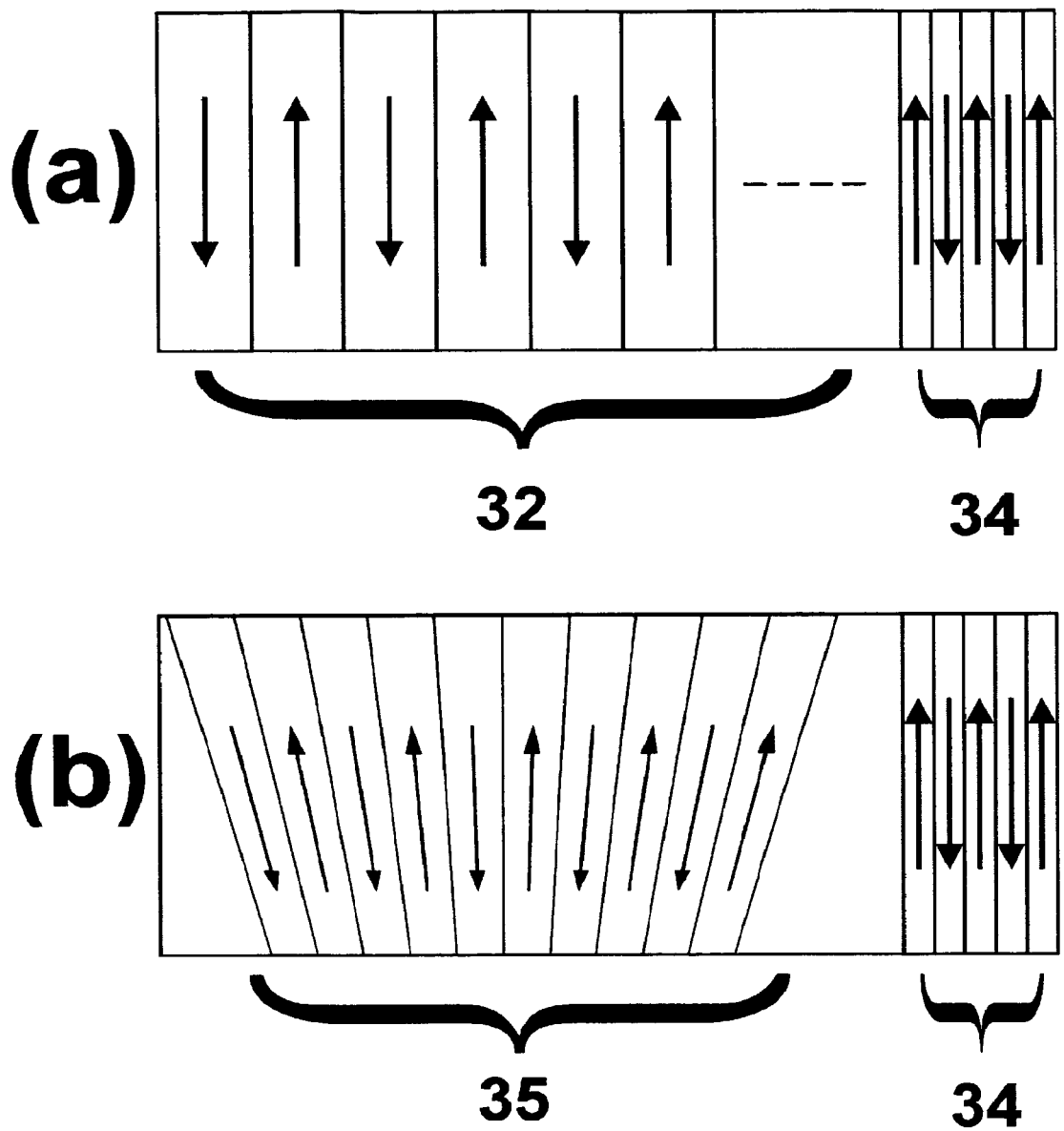
FIG. 5(*a*) is a section through a quasi phase matched non-linear crystal, with a standard grating, for use in an intra-cavity OPO system, the grating pattern being adapted to substantially suppress relaxation oscillations.

Whilst FIG. 4 shows the non-linear loss introduced as a discrete optical non-linear element 30 in the pump cavity, it will be appreciated that various other options for providing this non-linear loss may be used. For example, the non-linear loss could be provided within the same non-linear element 24 of the optical parametric oscillator. This could be accomplished in various ways, but in the case of a periodically poled element may, for example, involve having a section of the element poled, so as to phase match the non-linear process that is required for the purpose of stabilisation. An example of this is shown in FIG. 5(*a*), in which a first section 32 of the periodically poled OPO has one periodicity that is adapted to generate the required down converted waves, and the second section 34 has another, different periodicity that is adapted to suppress relaxation oscillations. An advantage of this option is that the number of surfaces can be kept to a minimum, which tends to reduce optical losses. Techniques for making periodically poled crystals are well known and so will not be described herein in detail.

FIG. 5(*b*) shows a similar dual-region quasi-phase matched scheme as outlined in FIG. 5(*a*), except that here the grating period resulting in down conversion of the pump field to signal and idler waves is of a fanned design. In this case, the temperature of the crystal would be varied in order to control the amount of non-linear loss associated with oscillation suppression (by changing the efficiency of the phase matching condition on region 34) and control the wavelengths of the down converted signal and idler waves by changing phase matching period in the region 35 by variations in the lateral position of the crystal relative to the resonant pump and down converted wave propagating within it.

The oscillator of FIG. 4 has been tested experimentally. For this purpose, the pump source 10 used was a thermoelectrically temperature stabilised c-package 3 W CW laser diode with an emission area of 200×1 µm². The wavelength output of the diode was closely matched into the peak absorption manifold of the Nd:YVO$_4$ by careful temperature selection and stabilisation. Collimating lenses 12, which were antireflection coated at the diode pump wavelength, were used to firstly collimate the light from the pump diode and then focus it into the rear face of the Nd:YVO$_4$ 14, forming a pumped volume with a radius of ~65 µm. The c-cut Nd:YVO$_4$ crystal was doped 1% at. Nd and had dimensions of 3×3×1 mm³. Its pumped face 16 was coated to be antireflective at the diode pump wavelength and highly reflecting at the OPO pump wavelength of 1.064 µm, thereby defining one end of the pump laser cavity. Its intracavity facet is antireflection coated for the 1.064 µm circulating field. Although the mirror coated onto the Nd:YVO$_4$ crystal is plane, thermal effects due to absorption of the diode pump field induce an effective radius of curvature of ~75-100 mm when pumped at 3 W.

An antireflection (at 1.064 µm) coated lithium triborate (LBO) crystal 30 of dimensions 3×3×20 mm³ was included in the collimated pump-only section of the cavity for the purpose of second harmonic generation (frequency doubling) SGH. It was held within a temperature stabilized oven whose temperature can be varied in order to bring the crystal in and out of its SHG phase matching condition. In this way, the effect of the frequency doubling process upon the relaxation oscillation damping time can be determined simply by varying the crystal temperature. The weakly focused circulating pump beam had a radius of approximately 110 µm within the LBO crystal. When the LBO crystal temperature was set to the optimum phase matching condition for frequency doubling, the 1.064 µm circulating power (with the OPO cavity blocked) fell by ~9.5%.

The intracavity lens 20 was antireflection coated at 1.064 µm. It had a 38 mm focal length, which served to form a pump waist with the end mirror 18 (30 mm radius of curvature) in the nonlinear crystal 24. It also desensitises the cavity from the effects of thermally induced lensing that form in the nonlinear crystal (NLC) as the circulating pump power is increased. The distance between the mirror and the intracavity lens was chosen such that the pump cavity remained stable over a large range of thermally induced effective radii of curvature in the laser gain medium, to efficiently match the circulating field into the diode-pumped volume and to act as an optical 'ballast' in the cavity to compensate for the lens which is thermally induced in the nonlinear crystal. The non-linear crystal 24 is a periodically-poled, MgO-doped LiNbO$_3$ nonlinear crystal (NLC) with dimensions of 1×6×30 mm³ and is triple-band antireflection coated at the pump, signal and idler wavelengths. The crystal had a single grating period of 30.7 µm. The crystal temperature was stabilised at 25° C. by a small heating element bonded to the copper tray in which the crystal was located. The double high reflector (highly reflecting at the pump and signal wavelengths, antireflection coated at the idler wavelength) CaF$_2$ end mirror 18 completes the high-finesse pump cavity. The useful idler output from the device is extracted through this mirror.

In order to discriminate the signal cavity from that of the pump, a dichroic beamsplitter 22 was placed between the intracavity lens 20 and the nonlinear crystal 24. The left-hand face of this is antireflection coated for the transmitted p-polarised pump field and the inner face is antireflection coated for the pump and broadband highly reflective for the incident signal field. The signal cavity is defined by the end mirror 18, the beamsplitter 22 and the signal mirror 26 (radius of curvature 75 mm), all of which are coated to be broadband highly reflecting at the signal wavelength tuning range. The separation of the end mirrors 18 and the signal mirror 26 was chosen to produce a signal waist in the centre of the nonlinear crystal, coincident with that of the pump waist.

In order to quantify the effect of the intracavity doubling process on the relaxation oscillations of the ICOPO, the diode pump power was modulated in order to perturb the steady state of the system. This was done at 1 kHz with a mark-space ratio of 15:85 with a modulation depth of ~50% diode pump power. The laser and parametric thresholds of the system were reached for pump powers of 0.45 and 1.5 W respectively. At a pump power of 3 W, ~90 mW of idler power was extracted through the common mirror 18.

Figure 6:
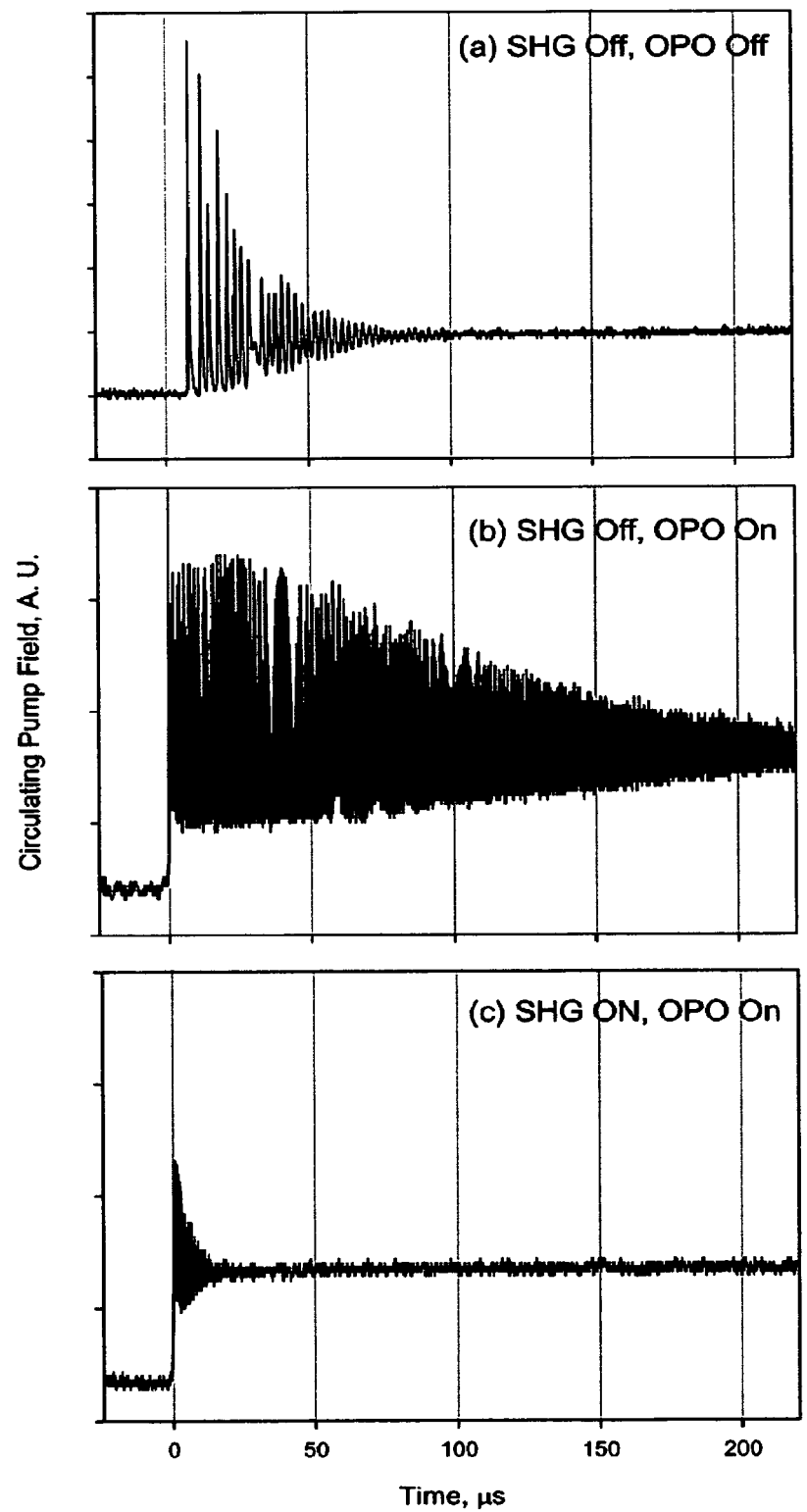
FIG. 6(*b*) shows the relaxation oscillation behaviour of an intra-cavity parametric oscillator that uses the laser of FIG. 6(*a*) as a pump.

FIG. 6 shows the dynamics of the system after it is returned to steady state pumping after perturbation. FIG. 6(*a*) shows the relaxation oscillation behaviour of the laser with the OPO cavity blocked by placing a card between the beamsplitter and the signal mirror in order to stop the parametric process, and the doubling crystal temperature tuned away from its SHG phase matching condition so as to eliminate the nonlinear loss due to the intra-cavity doubling process. The relaxation oscillations thereby observed are well known as being typical of the pump laser alone. Once the card was removed the parametric generation thereby allowed to take place had a significant and detrimental impact on both relaxation oscillation frequency and damping time, as shown in FIG. 6(*b*). Finally, the temperature of the doubling crystal was adjusted to optimise the phase matching condition for second harmonic generation so re-introducing the intra-cavity doubling process. The impact this had upon the relaxation oscillations is shown in FIG. 6(*c*), where it can be seen that their damping time is now comparable to (or even less than) that of the parent pump laser in the absence of parametric down conversion.

The frequency-spectrum of the intensity of the pump field when the system is operating in the absence of external diode laser pump power modulation, for the case excluding and including non-linear loss suppression, is shown in FIG. 7(*a*) & (*b*). In FIG. 7(*a*), the temperature of the LBO crystal was tuned well away from that which resulted in efficient second-harmonic generation. In this case, the system was susceptible to the onset of spontaneous and very long lived bursts of relaxation oscillations. These oscillations were present approximately ~70% of the time. The frequency-spectrum of the pump-field intensity was measured during one of the oscillation events and is shown in FIG. 7(*a*). Here, the first spectral feature (at ~4 MHz) corresponds to the fundamental oscillation frequency. The higher spectral components of the oscillations are also clear.

Figure 8:
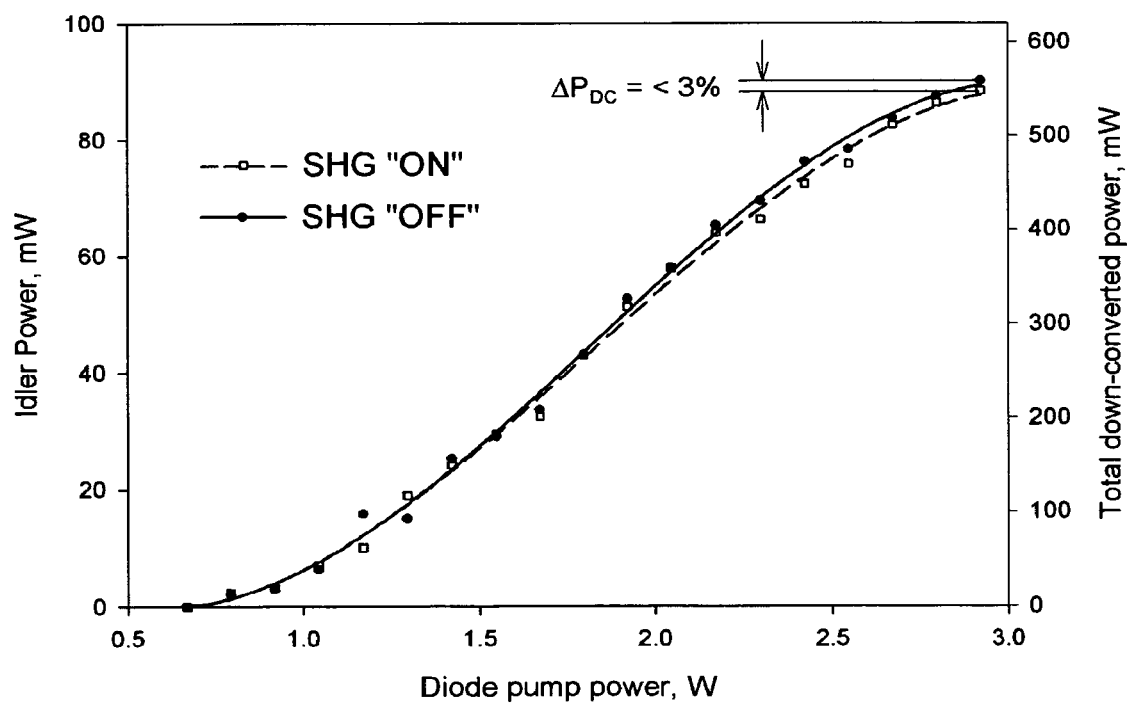
FIG. 8 shows the drop in down-converted power, which results from the inclusion of the non-linear loss inducing element.

FIG. 7(*b*) shows the frequency-spectrum of the intensity of the circulating pump field once the temperature of the LBO crystal was set for optimal second harmonic generation. It is clear that the oscillations are now absent, with the spectral content falling rapidly once above the DC level. Some very low noise features were observed but these were consistent with non-oscillation like acousto-mechanically induced perturbations, which could be easily eliminated through the use of superior mechanical designs. With the second-harmonic generation enabled, the system showed no signs of oscillatory behaviour. The loss incurred in the down-converted power generated due to the now present up-conversion process was ~3%, as indicated in FIG. 8. Therefore, it can be seen that the inclusion of the non-linear loss oscillation suppression scheme leads to very little penalty in down conversion efficiency.

A theoretical analysis based upon a rate equation approach has been developed that successfully confirms both in principle and practice the efficacy of nonlinear loss in controlling and eliminating relaxation oscillations. The three coupled nonlinear rate equations that describe the instantaneous pump field intensity, $P_p(t)$, the instantaneous down-converted signal (resonant) field intensity, $P_s(t)$, and the instantaneous population inversion $n_j(t)$, are:

$$\frac{d(P_s)}{dt} = \frac{P_s}{\tau_s} \cdot (P_p - 1)$$

$$\frac{d(P_p)}{dt} = \frac{P_p}{\tau_p} \cdot \left[\frac{n_j \cdot \sigma_j}{1+k} - 1 - \frac{(\sigma_j - 1 - k) \cdot P_s}{1+k} - \delta \cdot P_p\right]$$

$$\frac{d(n_j)}{dt} = \frac{1}{\tau_u} \cdot [1 + k - n_j - (k \cdot n_j \cdot P_p)]$$

Where $\tau_s$, $\tau_p$ and $\tau_u$ are the time constants describing the decay of the signal field intensity within the (passive) signal cavity; the pump field intensity within the (passive) pump cavity; and population inversion within the active laser gain medium respectively. The parameters (1+k) and $\sigma_j$ state the number of times above their oscillation thresholds that the parametric oscillator and the laser, respectively, are oscillating. The parameter 8 is the scaling parameter for the nonlinear loss experienced by the pump field intensity due to the introduction in this case of second harmonic generation. Numerical solutions of these equations under the conditions associated with the above described confirm the experimental findings discussed therein. Typical values of $\delta$, k and $\sigma_j$ are 0.01, 1 and 3, respectively.

It should be noted that whereas the above three coupled rate equations but with the nonlinear term excluded ($\delta=0$) are well-known in the former state of the art (see, for instance, "Continuous-wave, intracavity optical parametric oscillators: an analysis of power characteristics", Applied Physics B, Volume 66, 1998, Page 701), the inclusion of the nonlinear loss term is a novel feature of this analysis.

As another option, the non-linear loss could be arranged to occur as a result of some parasitic process within the non-linear element 24 of the OPO so that no modification to the OPO is required. This can be done, for example, by modifying the grating period of the quasi-phase matched nonlinear crystal, so as to enhance the nonlinear loss process, either through second harmonic generation or sum frequency mixing as previously described and indicated in FIG. 5(*a*) & (*b*).

Figure 9:
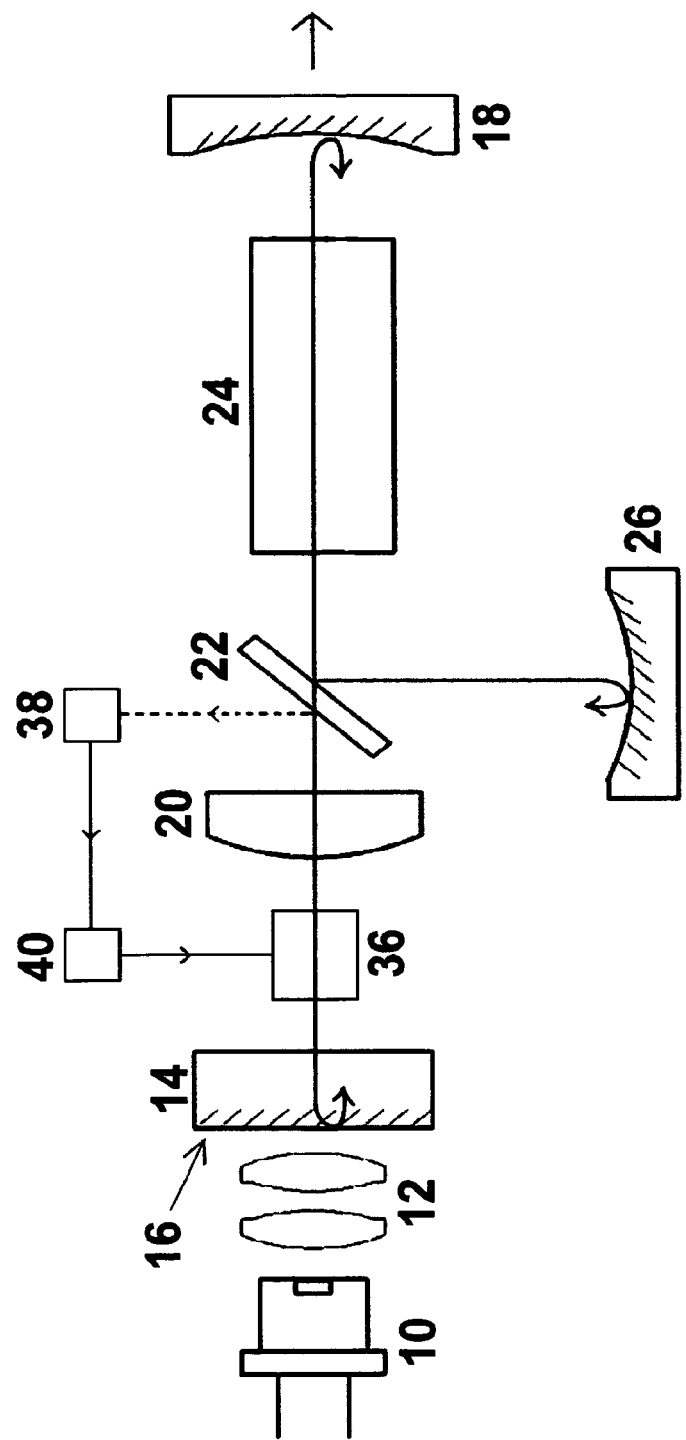
FIG. 9 is a schematic diagram of another intra-cavity OPO, in which relaxation oscillations are substantially suppressed.

As yet another alternative, the non-linear loss could be stimulated and/or controlled electrically or otherwise actively. FIG. 9 shows a particular, but not exclusive, example of this, in which the instantaneous intensity of the optical field within the appropriate optical cavity, either the resonated signal or idler field in the case of the optical cavity of the OPO, or the pump field in the case of the pump laser cavity is detected by a fast photodiode and used to electrically control the output of an optical element. More specifically, in the arrangement of FIG. 9, an electrically controllable optical modulator 36 is provided between the laser gain medium 14 and the intra cavity lens 20. Associated with the same cavity as the optical modulator 36 is a photo-detector 38 for detecting the cavity field. Connected to each of the optical modulator 36 and the photo-detector 38 is an electronic controller 40. The output of the photo-detector 38 is processed by the electronic controller 40 and used to provide a drive signal for the optical modulator 36. By varying the signal applied to the optical modulator 36, the optical loss within the cavity can be controlled to be non-linearly proportional, for example, quadratically proportional, to the intensity of the field detected by the photo-detector 38. It should be noted that in practice the time scales for this process should be minimised.

Figure 10:
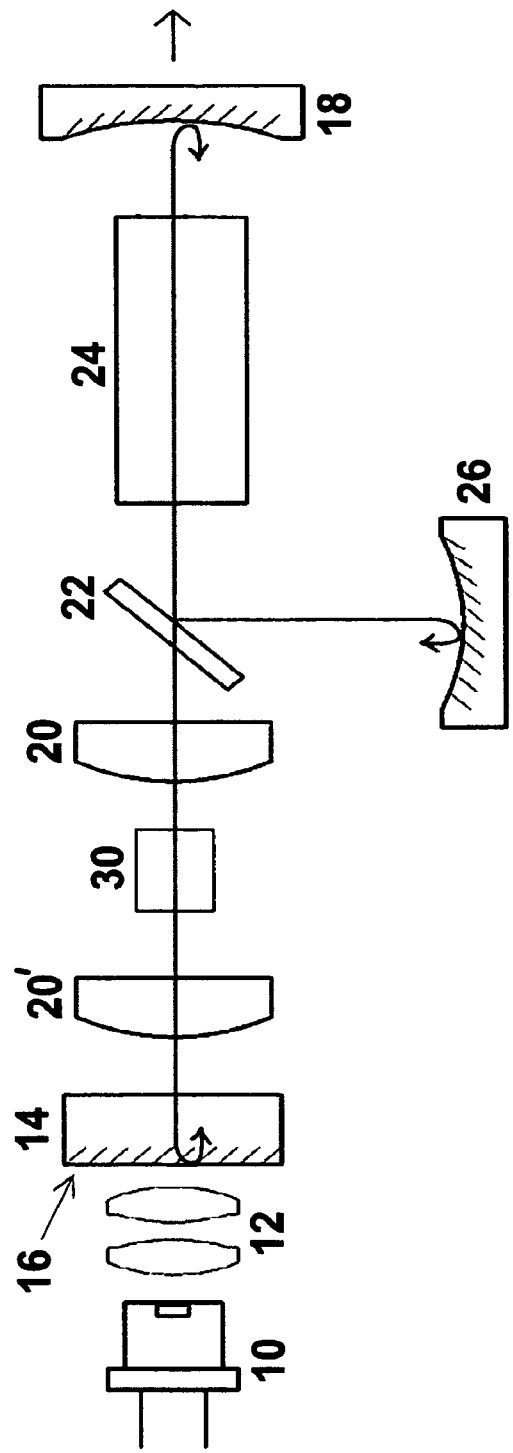
FIG. 10 is a schematic diagram of a modification to the intra-cavity OPO of FIG. 4.

FIG. 10 shows a possible modification to the OPOs of FIG. 4. In this, the non-linear element 30 that is adapted to reduce oscillations is located between two focusing elements 20 and 20'. These two elements define the shape of the pump beam that is incident on the element 30. By varying the position of the non-linear element 30 relative to the two lenses, the shape of the beam passing through it and so the efficiency of the non-linear loss can be varied.

Although the embodiments described above relate to the additional non-linear loss being proportional to the square of the appropriate intra-cavity field, this is not to be regarded as a limitation in any way but only for the purposes of describing a specific embodiment. The system in which the invention is embodied provides a very simple and effective solution to the long-standing problem of relaxation oscillations in intra-cavity optical parametric oscillators. By including a means for producing an additional non-linear loss in the optical cavity of either the optical parametric oscillator or the pump laser within which the OPO is located, relaxation oscillations can be reduced or eliminated altogether. This is advantageous.

It should be noted that although the parametric generation (down-conversion) process associated with the OPO is for all practical purposes instantaneous within the nonlinear element itself and likewise this is the case for the second harmonic generation (up-conversion) process introduced so as to provide the nonlinear loss required for stabilisation, they have associated with them time integrals due to the round-trip times associated with the optical fields within the cavities. This means that the mean energy transfer between the fields of the two cavities is not instantaneous. As already noted, the crystal used for the OPO can, however, also provide the required non-linear loss through two other general processes: (1) attendant non-phase matched processes that would normally be regarded as unwanted (parasitic), such as second harmonic generation and sum frequency mixing, although these can be difficult to control and so not preferred, and (2) in the case of quasi-phase matching, engineering of the OPO crystal grating period and or duty cycle to provide additional and controlled first or higher-order phase matched processes such as second harmonic generation and sum-frequency mixing and hence the required non-linear loss.

A skilled person will appreciate that variations of the disclosed areas are possible without departing from the invention. For example, although the invention has been described with reference to the intra-cavity OPO of FIG. 4, it will be appreciated that any suitable intra-cavity arrangement could be used. By this it is meant any system in which an OPO is positioned in the laser cavity that provides a fundamental pump wave for that OPO. Accordingly, the description of a specific embodiment is made by way of example only and not for the purposes of limitations. It will be clear to the skilled person that minor modifications may be made without significant changes to the operation described.

The invention claimed is:

1. A continuous wave intra-cavity optical parametric oscillator, comprising:
    a laser gain medium for generating a pump wave;
    a non-linear material for generating down converted coherent radiation in response to a pump wave, the down converted radiation comprising a signal wave and an idler wave;
    two coupled optical cavities, one of said optical cavities being a pump-wave cavity for resonating the pump wave and the other of said optical cavities being a down converted wave cavity for resonating the signal wave or the idler wave, wherein the non-linear material and the laser gain medium are located in the pump-wave cavity and the non-linear material is located in the down converted wave cavity, and
    a non-linear loss element for providing a continuous non-linear loss for suppressing relaxation oscillations, wherein the non-linear loss element is located in the pump-wave cavity and/or the down converted wave cavity.

2. The continuous wave intra-cavity optical parametric oscillator as claimed in claim 1, wherein said non-linear loss element is located in the pump-wave cavity and is configured to generate a second harmonic of the continuous intra-cavity pump-wave.

3. The continuous wave intra-cavity optical parametric oscillator as claimed in claim 1, wherein said non-linear loss element is located within both the pump-wave cavity and the down-converted wave cavity and is configured to frequency mix the continuous intra-cavity pump-wave with the continuous wave that is resonated in the down converted wave cavity.

4. The continuous wave intra-cavity optical parametric oscillator as claimed in claim 1, wherein the non-linear loss element is located within the down-converted wave cavity, and is configured to generate a second harmonic of the continuous wave resonated in the down-converted wave cavity.

5. The continuous wave intra-cavity optical parametric oscillator as claimed in claim 1, wherein the non-linear loss element comprises a quasi phase-matched crystal.

6. The continuous wave intra-cavity optical parametric oscillator as claimed in claim 1, wherein the non-linear loss element comprises a crystal that allows a type I birefringent phase match process to occur to thereby provide the continuous non-linear loss.

7. The continuous wave intra-cavity optical parametric oscillator as claimed in claim 1, wherein the non-linear loss element and the non-linear material for generating down converted coherent radiation are the same element.

8. The continuous wave intra-cavity optical parametric oscillator as claimed in claim 1, wherein the non-linear loss element is configured to provide a variable loss for suppressing relaxation oscillations.

9. The continuous wave intra-cavity optical parametric oscillator as claimed in claim 8, wherein the non-linear loss element is variable to suppress relaxation oscillations in response to an electrical signal.

10. The continuous wave intra-cavity optical parametric oscillator as claimed in claim 8 comprising a monitor for monitoring an intensity of an intra-cavity field.

11. The continuous wave intra-cavity optical parametric oscillator as claimed in claim 10 comprising a feedback loop between the monitor and the non-linear loss element for feeding back a signal to cause the non-linear loss element to be varied in response to the monitored instantaneous intensity.

12. The continuous wave intra-cavity optical parametric oscillator as claimed in claim 8, wherein the non-linear loss element comprises an optical modulator for suppressing relaxation oscillations.

13. A continuous wave intra-cavity optical parametric oscillator, comprising:
    a laser gain medium for generating a pump-wave;
    a non-linear material for generating down converted coherent radiation in response to a pump-wave, the down converted radiation comprising a signal-wave and an idler-wave; and
    two coupled optical cavities, one of said optical cavities being a pump-wave cavity for resonating the pump-wave and the other of said optical cavities being a down-converted wave cavity for resonating the signal-wave or the idler-wave, wherein the non-linear material and the laser gain medium are located in the pump-wave cavity and the non-linear material is located in the down-converted wave cavity, wherein said non-linear material is configured to induce parasitic effects that create a non-linear loss for suppressing relaxation oscillations.

\* \* \* \* \*

UNITED STATES PATENT AND TRADEMARK OFFICE
CERTIFICATE OF CORRECTION

PATENT NO. : 8,830,565 B2
APPLICATION NO. : 13/002309
DATED : September 9, 2014
INVENTOR(S) : Malcolm Harry Dunn, James Mark Stothard and Cameron Francis Rae It is certified that error appears in the above-identified patent and that said Letters Patent is hereby corrected as shown below:

Title page, Item (12), change inventor name from "Dun et al.;" to
-- Dunn et al. --

Title page, Item (75), change the first named inventor from "Malcolm Harry Dun, Fife (GB);" to
-- Malcolm Harry Dunn, Fife (GB) --

Signed and Sealed this
First Day of December, 2015

Michelle K. Lee
*Director of the United States Patent and Trademark Office*